Sept. 7, 1965 R. F. GRAY 3,204,714
ENDLESS TRACK VEHICLE
Filed July 30, 1963 6 Sheets-Sheet 2

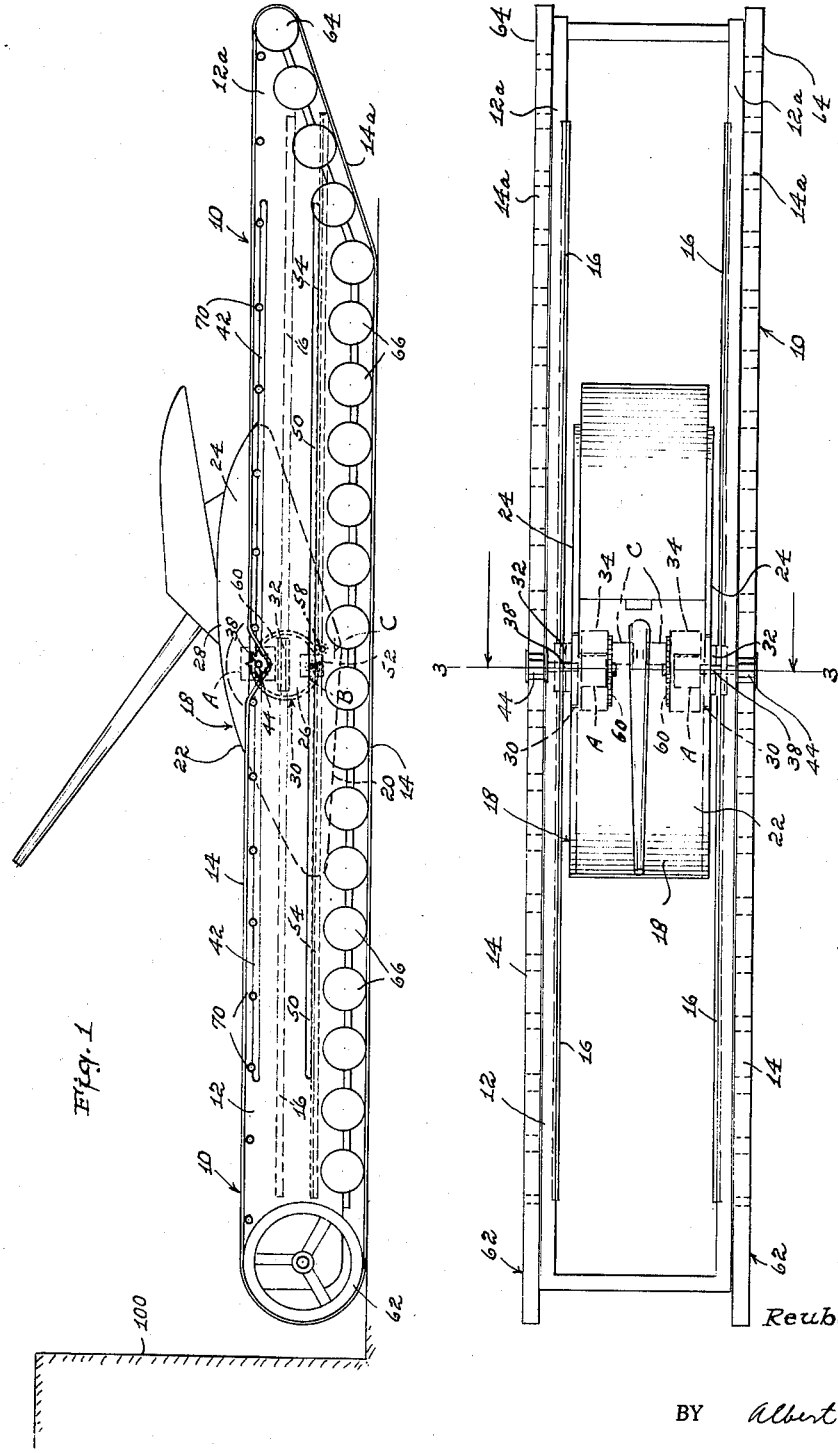

Reuben F. Gray
INVENTOR.

BY Albert Sperry
ATTORNEY

Sept. 7, 1965 R. F. GRAY 3,204,714
ENDLESS TRACK VEHICLE
Filed July 30, 1963 6 Sheets-Sheet 3
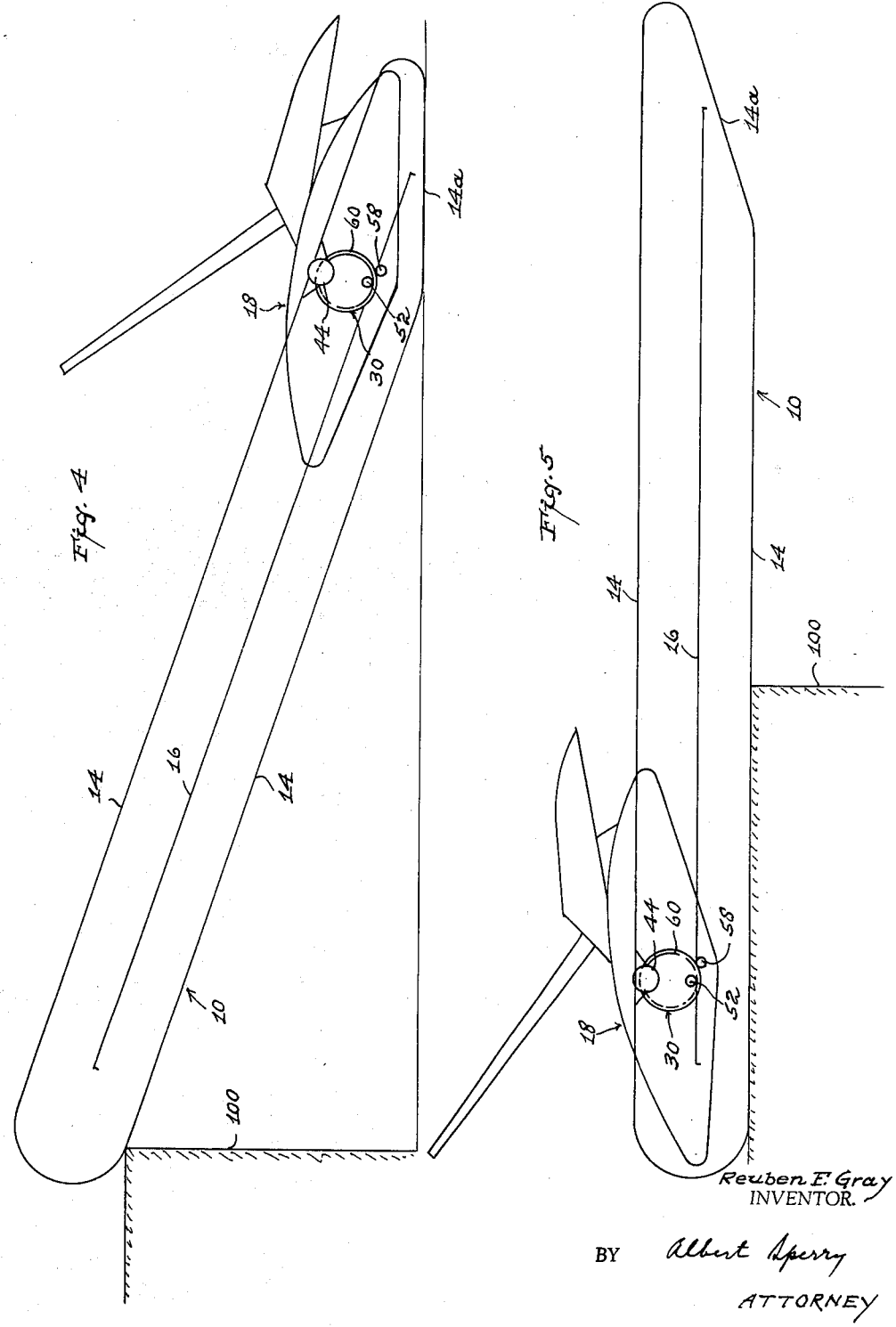
Reuben F. Gray
INVENTOR.
BY Albert Sperry
ATTORNEY

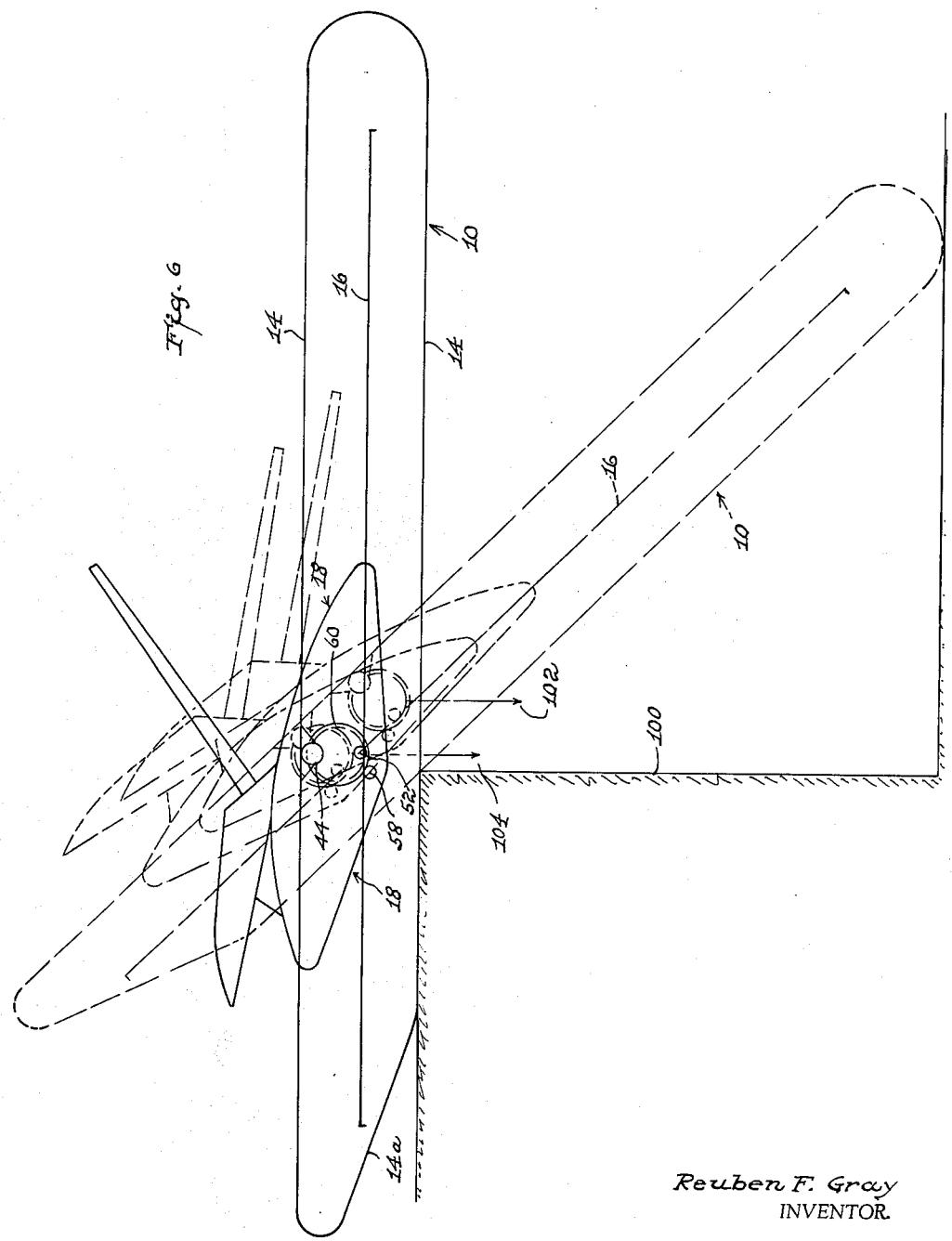

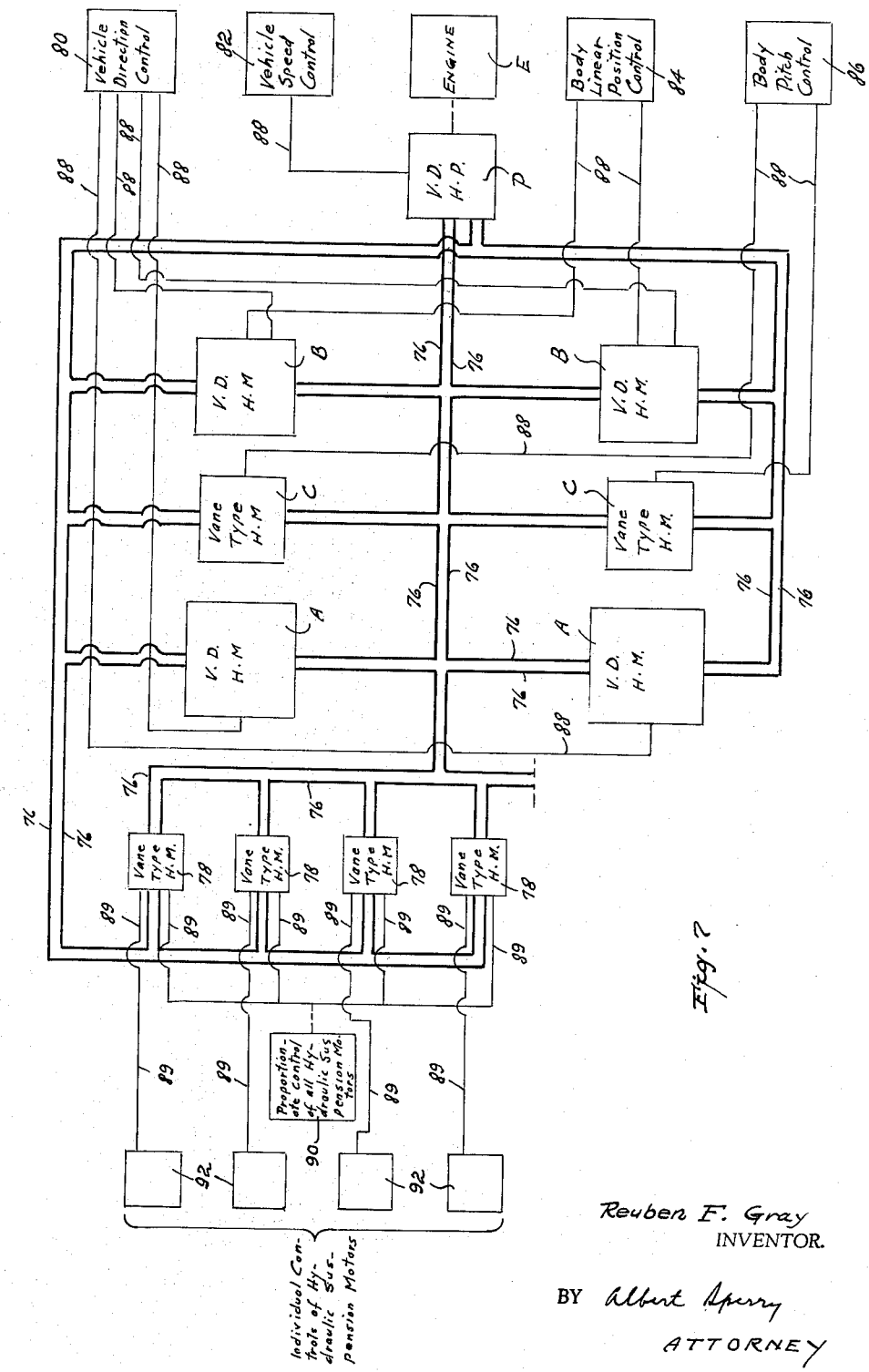

Sept. 7, 1965 R. F. GRAY 3,204,714
ENDLESS TRACK VEHICLE
Filed July 30, 1963 6 Sheets-Sheet 6
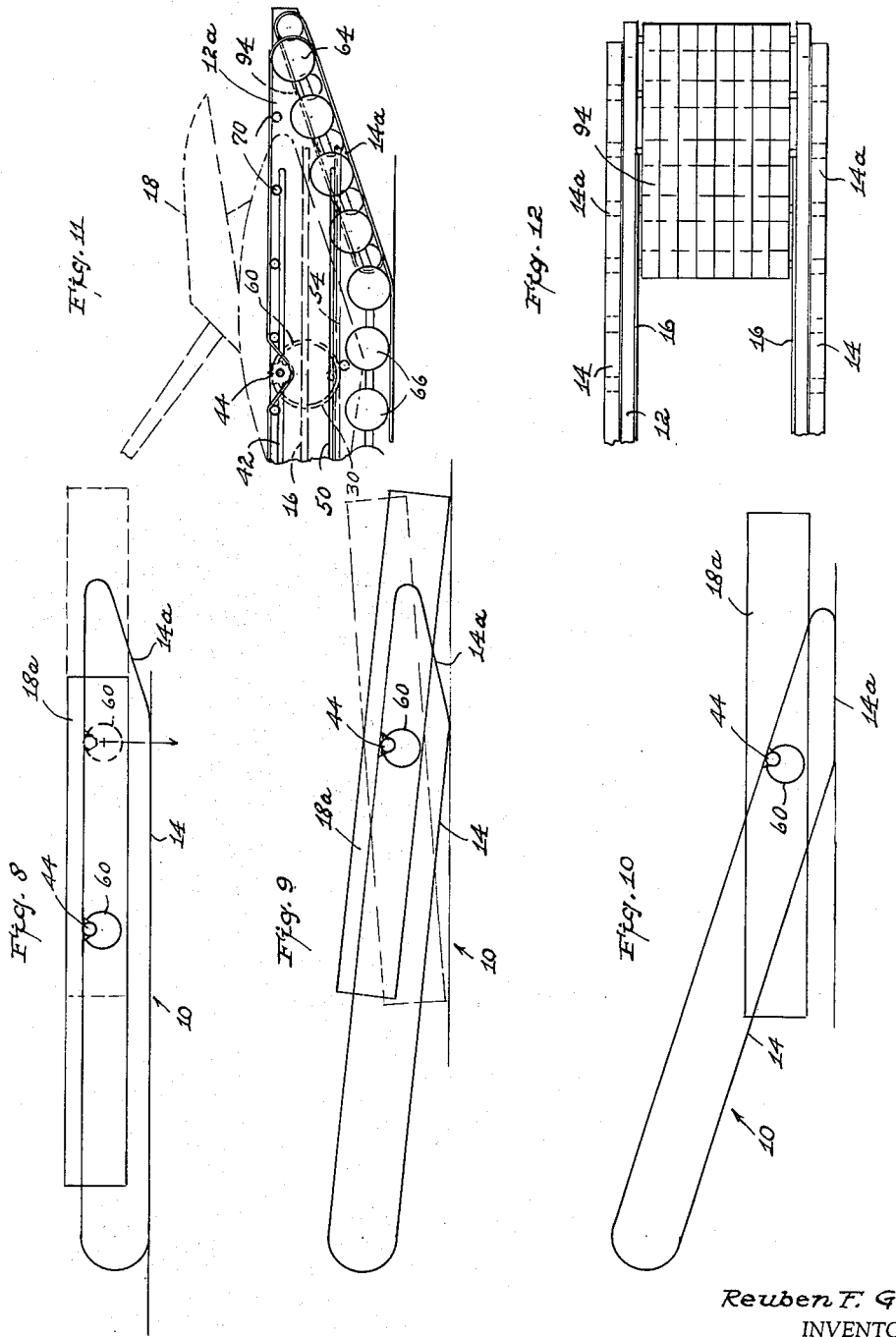
Reuben F. Gray
INVENTOR.
BY Albert Sperry
ATTORNEY

United States Patent Office 3,204,714
Patented Sept. 7, 1965

3,204,714
ENDLESS TRACK VEHICLE
Reuben F. Gray, 85 Cherry Lane, Levittown, Pa.
Filed July 30, 1963, Ser. No. 298,637
15 Claims. (Cl. 180—6.7)

This invention relates to improvements in endless track vehicles, particularly of the type designed for bearing artillery units or other heavy equipment or containers for transporting heavy cargoes of materials.

As such vehicles increase in weight they tend to sink farther down into soft soils, with the result that they meet with increasing resistance from the soil in opposition to forward movement. To overcome this increased sinking it is desirable to increase the area of the track or treads and thus spread the load over a larger soil area.

Although it would be preferable to increase the area of the treads by lengthening the treads and thus avoid increasing the area of the front of the treads which meet the opposition of the soil, this has been found to have the great disadvantage that the treads meet increased sidewise resistance to turning with increase in length. Therefore, attempts have been made to overcome this disadvantage by widening the treads and moving them farther apart, which permits greater turning force to be applied to the tread on the inside of the turn, and thus acts to allow some increase in tread length. However, this increase in length is obtained at the cost of increasing the strain on the treads.

Therefore, one of the principal objects of the present invention is to provide means of reducing the resistance to turning of endless track vehicles of the type referred to and thus render it practicable to obtain the full advantages of longer treads than those which have heretofore been usable.

Among further objects of this invention are the following:

(a) Improved weight carrying ability of the vehicle;

(b) Improved efficiency and maneuverability of the vehicle through decreased resistance to forward and turning movements as compared with wide treads of previous design;

(c) More comfortable riding for ocupants of the vehicle, through averaging the effects of a greater range of ground surface level variations;

(d) Increase of cross-country speed potential by reducing the jostling of the structure and crew of the vehicle;

(e) Further increase of cross-country speed potential by reducing the number of obstacles over which the vehicle could not ride, and thereby reducing the number of bypasses that would be necessary;

(f) A greater range of travel of the vehicle with a given amount of fuel due to increased efficiency;

(g) Avoidance of hazardous situations due to increased turning ability; and (h) Reduction of logistic requirements of Army vehicles due to their increased weight carrying ability and increased efficiency.

The foregoing objects are achieved by means of the following improved features of construction and operation of an endless track vehicle of the type referred to.

(1) A relatively short section of the frame, together with the treads supported thereby, at the rear end of the vehicle is sharply inclined rearwardly at an angle with the much longer horizontal section of the frame and treads;

(2) The artillery unit, material container or other heavy body carried by the vehicle is mounted on the frame of the vehicle in such a manner that the center of gravity of the vehicle can be quickly changed by moving the body forwardly and rearwardly in relation to the treads of the vehicle. The weight of the body when shifted to a position at the rear end of the vehicle is sufficient to raise, or substantially reduce the weight on the ground, of the forward portion of the frame and treads during a turn while traveling in the forward direction, irrespective of whether the rear portion was inclined. However, with the rear section inclined rearwardly, the weight of a heavy body when shifted to a position over the inclined section will cause the frame and treads to force the short section to a horizontal position, and correspondingly raise the front portion. In this position the vehicle can be pivotally turned upon the short section then in contact with the ground, with all resistance to turning restricted to the short section, notwithstanding that the total length of each tread may be many times that of the short section. The turning movement may be further facilitated by the installation of a plurality of parallel auxiliary, or idler, treads between the main treads of the short section to provide a bearing surface for the vehicle when in its up-tilted position. The total area of the idler treads might be as great as the area of the main treads on the ground with the vehicle in a horizontal position. With the improvements mentioned the main treads may advantageously be made relatively long and narrow and the width of the vehicle correspondingly reduced as compared with similar vehicles of previous design.

(3) Additional advantages effected by the raising and lowering of the front ends of the treads and the facility of quickly shifting the body from one end of the vehicle to the other include positive aid to the vehicle in going over high obstacles, in stabilizing the vehicle when traveling up and down steep slopes, bridging chasms and going down over a cliff. For example, in going over an obstacle of such height as to threaten the overturning of the vehicle, with the front tumbling over backwards, then quick forward movement of the body in relation to the treads will place the center of gravity over, or beyond, the obstacle, thus stabilizing the vehicle and raising the rear of the treads, after which the vehicle can proceed on its way. In traveling up and down steep slopes the vehicle can be stabilized by shifting the body to the uphill end of the treads. In bridging a chasm, it is approached with the body riding above the rear of the longer bearing-segment of the tread. After the front end of the tread is sufficiently over the opposite bank of the chasm the vehicle is stopped, and the body shifted to the front end of the tread and over the opposite bank. Then, when the vehicle again moves forward the treads will be maintained in their horizontal position by the weight of the body. In going down over a cliff it is approached with the body near the rear of the treads. The vehicle is then advanced slowly until it becomes slightly overbalanced and tilted down the cliff. The front ends of the treads will come to rest at the base of the cliff. The angular acceleration of tilt will be low for the reason that the torque turning the vehicle downward will be small if the overbalance is slight. Therefore, the front end of the vehicle will strike the ground at the base of the cliff with very much less force than if the vehicle had simply fallen over the cliff. After the front of the treads are on the ground the body can be moved along the treads until it is near the bottom of the cliff, after which the vehicle can travel forwardly. The rear of the treads, relieved of most of the burden of the body will gain substantial support from the vertical side of the cliff during the decent of the rear of the vehicle.

(4) Another advantageous improvement embodied in the present invention resides in means for rotating the body relative to the vehicle frame and treads in cooperation with the means for shifting the body to vary the center of gravity. This cooperative arrangement is of particular advantage in permitting a body of exceptionally long construction to be maintained in a horizontal position while the front of the vehicle is being raised, thereby preventing the rear end of the body from gouging into the ground when moved to the rear end of the vehicle. This feature enables the use not only of long military units, or equipment, but also permits the use of material containers extending substantially the entire length of the vehicle, if desired.

The means for driving the treads, the means for varying the center of gravity of the vehicle by moving the body back and forth along the treads, and the means for rotating the body are all actuated and controlled separately, but in cooperative relation. In the present embodiment of my invention the motors for driving the treads, for shifting the body along the treads and for rotating the body are all mounted within the body. The central portions of the side walls of the body are of circular formation and are fixedly attached to the vehicle frame so that the main portion of the body can be rotated around the central portions. Tread driving gears are mounted on shafts projecting outside the body from the tread driving motor, and gears on a shaft projecting from the body shifting motor engage longitudinally extending racks mounted on each side of the vehicle frame. The four motors referred to are preferably contained in housings to which they are fixedly attached, the housings being in turn fixedly attached to the central wall portions of the body supports. The motors for rotating the body are attached to the rotatable portion of the body and are provided with small gears in engagement with large gears mounted on the outer walls of the housings containing the two first mentioned motors.

The motors may all be of conventional variable displacement hydraulic type actuated through a conventional variable displacement hydraulic pump operated by an engine of conventional type. Although operation of all the motors may be controlled by manually actuated means, for most of the operations it is preferable to employ conventional position servo-controls on the body drive and velocity servo-controls on the tread drive. Manual control may be preferable for controlling rotation of the body. The automatic controls referred to are available in the market and are dependable in cooperation with various standard instruments in automatically controlling the operation of the motors which effect the body drive and the tread drive, such, for example, as a potentiometer for controlling the body drive in correctly positioning the body on the vehicle frame, and a tachometer for controlling the speed of each of the tread actuators, which must vary from each other, particularly in the turning operation. However, all the instrumentalities referred to are of conventional design and available in the market, and, therefore, form no specific part of this invention.

With automatic means for effecting quick movement of the body back and forth along the tread frame as the vehicle is subjected to pitching movements in going over rough ground, a high degree of stabilization of the vehicle can be maintained. This affords limitation of the tilting rate of the vehicle when the forward or rearward portions of the treads become unsupported and the center of gravity of the vehicle is on the unsupported side. Such an unsupported condition can exist whenever the vehicle goes over a hill or crevasse. Reducing the rate at which the vehicle tilts and falls downward can reduce the impact against the ground, which would act to protect the mechanism and contents of the entire vehicle. Such stabilization of the entire vehicle will increase the ability of the long treads to average out the vertical variations due to travel over bumps and hollows, because the front of the tread will not fall as far down the slope of the oncoming bump as it normally would. Therefore, it need not rise as much as without such stabilization, and would not be subject to as much impact when striking the bump. This type of servo-control can be accomplished by measuring the angular acceleration of the tread frame with an angular accelerometer and matching it to a signal indicating the limit on angular acceleration or angular velocity. The matching would be accomplished by utilizing any difference between the two signals as a signal to control the position of the body along the treads in a manner such as to limit rotary torques due to the falling of the unsupported vehicle around a pivot point on the ground.

In a vehicle having a pitch stabilization system of the type indicated in the foregoing paragraph, the body position would change with change in the slope of the ground over which the vehicle was traveling. The change in body position would be such as to move the body to the uphill side of the vehicle. This would then automatically increase the sability of the vehicle when traveling up and down hill.

The rollers supporting both the lower and upper runs of the treads may be urged against the treads by means of hydro-pneumatic spring action units on which the rollers are journaled, such units being supplied with hydraulic pressure from the same source which supplies hydraulic pressures to the motors actuating the treads and movable body.

Other objects and advantages of my improved endless track vehicle will appear or be pointed out in the following specification in which reference is had to the accompanying drawings forming a part thereof, and in which:

FIG. 1 is a side elevation in schematic outline showing one form of endless track vehicle of my improved design, some of the less essential details being omitted for greater clarity of illustration;

FIG. 2 is a top plan view of the vehicle shown in FIG. 1;

FIG. 4 is a schematic side elevation of the vehicle in the operation of climbing over a cliff or similar barrier;

FIG. 5 is a view similar to FIG. 4 showing the vehicle after surmounting the cliff or barrier;

FIG. 6 is a schematic view showing the vehicle in the operation of going downwardly from a cliff or barrier;

FIG. 7 is a diagram showing the hydraulic motors and other actuating units for driving the vehicle treads, for effecting the movement of the artillery unit or other body back and forth along the tread frame, and for rotating the body lengthwise of the treads;

FIG. 8 is a schematic view of the vehicle in which the movable body consists of a long cargo carrying container;

FIG. 9 is a view similar to FIG. 8, showing the vehicle with the same body, but showing the result of raising the front of the vehicle after the body has been shifted to the rear end of the vehicle;

FIG. 10 is a view similar to FIGS. 8 and 9, but showing the body rotated to a horizontal position as the front of the vehicle is raised by the weight of the body at its rear end;

FIG. 11 is a detail view similar to FIG. 1 but showing the addition of an auxiliary idler tread unit; and FIG. 12 is a top plan view of FIG. 11.

Figure 3:
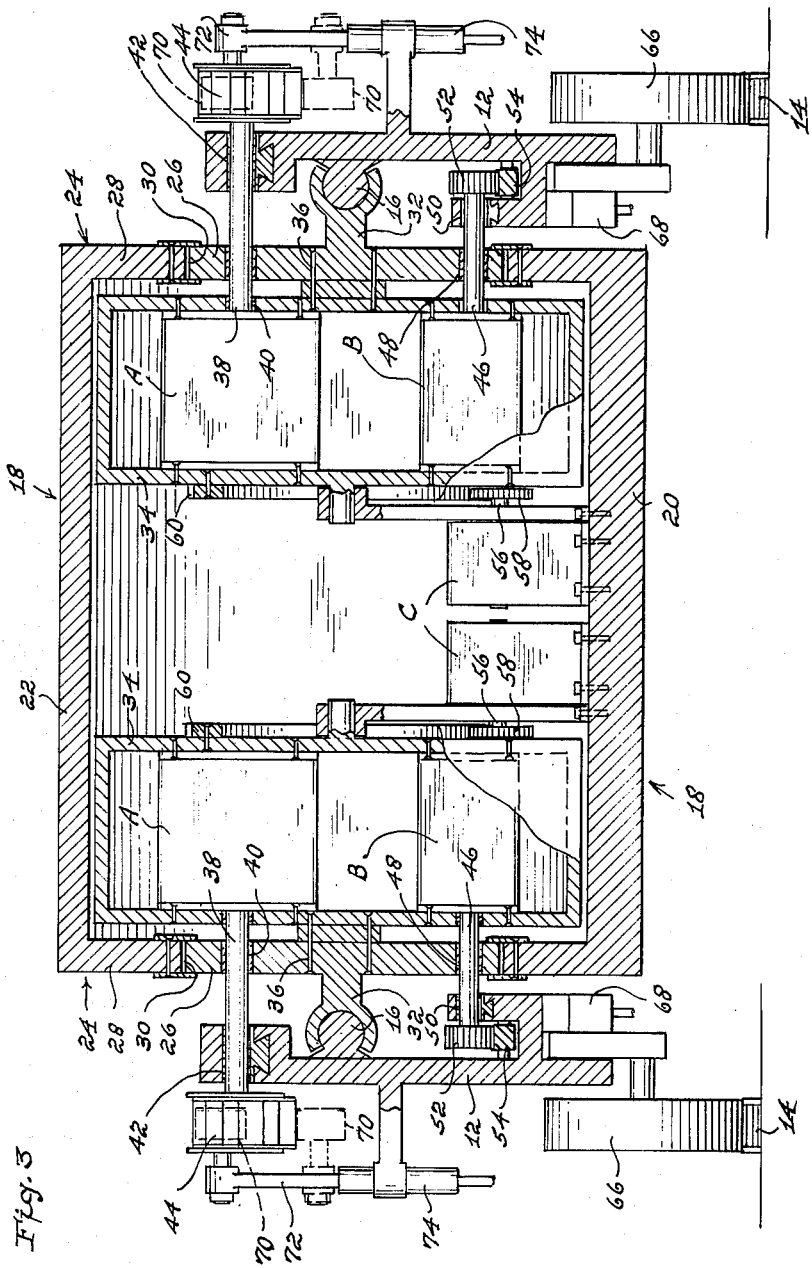
FIG. 3 is a transverse section taken on the line 3—3 of FIG. 2, and more fully showing the operating units and structural details.

Referring to the drawings in which like numerals designate like parts or elements in the several views and referring first to FIGS. 1 to 7, the embodiment of my invention illustrated in those views represents a military endless track vehicle, designated generally by the numeral 10, and including an exceptionally long and narrow frame 12 having parallel and transversely spaced side walls on the outer sides of which are mounted the endless treads 14 for propelling the vehicle along the ground. The frame 12 merges at its rear end into a short section 12a inclined from the bottom of the tread rearwardly of the vehicle, and supporting correspondingly inclined sections 14a of the treads 14. Attached to the inner longitudinal walls of the frame 12, and extending along nearly their entire length are parallel rails or tracks 16 on which a vehicle body, designated generally by the numeral 18, and comprising, in the embodiment illustrated, an artillery fuselage or unit, is mounted for longitudinal movement on the rails 16 in either direction.

As shown more clearly in FIG. 3, the body or fuselage 18 comprises a housing having a bottom wall 20, a top wall 22 and side walls 24, the side walls being divided into central circular portions 26, non-rotatably mounted on the rails 16, and outer portions 28 having central circular openings 30 through which they are rotatably mounted on the central circular portions 26, which are mounted for longitudinal movement on the rails 16 by means of lateral brackets 32. Although the brackets are illustrated as being slidably mounted on the rails, they may be provided with ball or other suitable bearings to reduce friction.

Motor housings 34 are fixedly attached to the inner walls of the central non-rotatable portions 26 of the fuselage or body 18 by bolts 36 or other suitable means, and a variable displacement hydraulic rotary motor A is fixedly mounted on the wall inside of each of these housings. Shafts 38 project from the motors through bearings 40 in the central portions 26 and through slots 42 in the frame 12 and have sprockets 44 mounted on their outer ends in engagement with the treads 14 for driving the treads.

Another variable displacement hydraulic motor B is also fixedly mounted on the wall inside of each housing 34. Shafts 46 project from these motors through bearings 48 in the central portion 26 of the body 18 and through slots 50 in the frame 12. The shafts 46 have gears 52 mounted on their outer ends in engagement with rack members 54, of substantially the same length as the track members 16 and fixedly attached to the side walls of the frame 12 and of substantially the same length as the rails 16. The function of these motors, gears and racks is to shift the center of gravity of the vehicle 10 along the treads 14 by forward and backward movement of the body 18 along the racks 54, the two motors being in synchronized speed relation.

Still another rotary motor C of a vane hydraulic type is fixedly mounted on the bottom wall 20 of the body 18 outside each of the housings 34. Shafts 56 project from these motors toward the housings 34 and have mounted on their outer ends small gears 58 in engagement with large annular gears 60 fixedly mounted on the outer walls of the housings 34. The function of these motors and gears is to rotate the body 18 to vary its longitudinal angular alignment, and are also synchronized. A single motor C can be employed by having the shaft 56 project from each end of the motor.

The treads 14 are mounted at their front ends on large pulleys 62 and at their rear ends on smaller pulleys 64, all journaled on the frame 12, as shown in FIG. 1. The lower runs of the treads 14 are supported on rollers 66, which are mounted on supports 68, and the upper runs of the treads 14 are supported by rollers 70 which are journaled on the piston rings 72 of cylinders 74 mounted on the vehicle frame 12, as indicated in FIG. 3.

As shown in FIG. 1 the bottoms of the tread drive sprockets 44 are below the main upper runs of the treads 14 and in engagement with loop portions of the treads. The cylinders 74 are of sufficient length to permit the rollers 70 to be depressed to a plane below the sprockets 44 and thus permit the sprockets to ride over the rollers as the sprockets are moved along the frame with the body 18.

As shown in the diagram FIG. 7, a single variable displacement hydraulic pump P driven by a conventional engine E may be employed to supply hydraulic pressure through distribution pipes 76 to the variable displacement hydraulic motors A and B and also to the hydraulic vane type motors C, as well as to the other vane type motors 78. As shown in the diagram FIG. 7, various conventional type servo-controls including a direction control 80 connected with motors A for controlling the relative speed of the treads (as, for example, in turning); a speed control 82 connected with the pump P for controlling output of the pump, a body linear position control 84 connected with motor B for controlling the position of the body 18 along length of the vehicle independently of direction control; and a body pitch control 86 connected with motor C for controlling the body pitch angle relative to the treads so that a long body 18 or cargo container can be positioned in such a manner as not to interfere with the tilting of the vehicle and treads. The controls 80, 82, 84 and 86 are connected in suitable electrical circuits (not shown) by individual wirings, as indicated at 88 in FIG. 7. Additionally, a suitable proportional control 90 for all hydraulic motors 78, as well as the individual motors 78 and individual controls 92 for such motors are connected in electrical circuits (not shown) by individual wirings as indicated at 89 in FIG. 7. The servo controls may be of the type known as "Hydroac" and described in a publication of Houdaille Industries, Inc. dated April 1962.

In the embodiment of my invention, shown schematically in FIGS. 8, 9 and 10, the movable body 18a consists of an elongated container mounted on the vehicle frame and actuated in the same manner as that of the artillery fuselage shown in the previous views. In FIG. 8 the vehicle 10 and the body 18a are shown in their horizontal positions, with the shifting of the body to the rear of the vehicle shown in broken lines. In FIG. 9 is shown the result of lifting the front of the vehicle and treads with the body 18a at the rear end of the vehicle and in parallel relation with the treads, in which the rear end of the body gouges into the ground, thereby preventing completion of the tread tilt. In FIG. 10 is shown the front of the treads raised until the short rear sections 14a are parallel with the ground, and with the body 18a rotated until it also is parallel with the ground.

The form of my invention shown in FIGS. 11 and 12 is the same as that shown in FIGS. 1 to 7 with the addition of an idler tread unit 94 installed on the frame 12 between the inclined rear sections 14a of the main treads 14. This idler tread unit may comprise a number of narrow treads in adjacent parallel relation. The purpose of the idler treads is to support the vehicle when the short inclined rear section is on the ground, with the front of the vehicle in raised position; and the total area of tread bearing on the ground with the front end of the vehicle tilted upward may thus be made equal to the area of the main treads on the ground with the vehicle in the horizontal position. This idler tread can greatly facilitate the turning of the vehicle, particularly when turning on soft ground.

As shown schematically in FIG. 4, when approaching a high embankment or cliff 100 the operator will shift the body 18 to the rear end of the vehicle 10 causing the front end to be lifted and climb to the top surface of the cliff. The body is then shifted to the front end of the vehicle, thereby causing the rear of the vehicle to be raised to a partial or wholly horizontal position to enable the vehicle to proceed forwardly on the ground at the top of the cliff or embankment, as shown in FIG. 5.

As shown in FIG. 6, when the vehicle is going down over the cliff 100 and the front end declines toward the bottom, the body 18 is shifted upwardly, thereby shifting the center of gravity indicated by the arrow 102 to a point close to the pivot point on which the vehicle is supported at the edge of the cliff, as indicated in broken lines and by the arrow 104.

As shown in FIG. 8, when the body 18a consists of an elongated cargo container it can be shifted to the rear end of the vehicle. However, as shown in FIG. 9, when the vehicle is tilted to bring the base of the short inclined section of the tread 14a into contact with the ground, the rear end of the body 18a will contact and gouge into the ground. This can be corrected, as shown in FIG. 10 by rotating the body 18a to a horizontal position, after which the vehicle can proceed on its way.

As shown in FIGS. 11 and 12, an idler unit 94 may be installed between the main treads of the inclined section 12a of the frame and treads. As previously mentioned, the total area of the idler treads may be equal to the area of the straight portion of the treads. This provides a positive support for the rear end of the vehicle when resting on the short inclined section, and greatly facilitates the operation of turning the vehicle, particularly on soft ground.

It should be pointed out that when the vehicle 10 is going up or down a steep incline (not shown) the vehicle can be prevented from over-balancing by shifting the center of gravity of the vehicle by moving the body 18 up or down the treads 16 and thus maintain the center of gravity over the supporting portions of the treads.

As previously mentioned, in the operation of all of the motors actuating the treads 14 in either direction, and at differing speeds, the movement of the body 18 or 18a along the track members 16, and the rotation of the body 18 or 18a, can all be controlled by conventional servo-control elements as indicated in the diagram FIG. 7, or by other suitable control means, which form no specific part of this invention.

Therefore, it will be seen that I have provided an endless track vehicle for either military or civilian use capable of utilizing long and narrow treads to great advantage, not only in the carrying of heavy bodies but in various other advantageous ways rendered possible by my improved construction.

Obviously various changes or modifications may be made in my improved vehicle construction without departing from the spirit or scope of my invention. Therefore, it should be understood that the embodiments of my invention shown and described are intended to be illustrative only and restricted only by the appended claims.

I claim:

1. In an endless track vehicle having an elongated frame with transversely spaced side walls, a plurality of tread supporting rollers journaled on the outer sides of said walls, a pair of endless treads on said rollers, a vehicle body mounted for longitudinal movement along said frame; motors mounted within said body and movable therewith, means actuated by said motors engaging said treads for driving said treads in either direction independently of the other, and also means within said body for engagement with means on said frame for moving said body along said frame throughout the greater portion of its length in either direction.

2. An endless track vehicle as claimed in claim 1 in which a relatively short rear end section of the frame, together with the treads thereon, is inclined rearwardly from the bottoms of said treads, and in which the weight of the vehicle body when moved over said short inclined section of the frame will raise the front of the frame and treads and force the short inclined sections of the treads into contact with the ground.

3. An endless track vehicle as claimed in claim 1 and said means within said body including means for moving said body longitudinally with respect to said frame in either direction.

4. In an endless track vehicle having an elongated frame with transversely spaced side walls, a plurality of tread supporting rollers journaled on the outer sides of said walls, a pair of endles streads mounted on said rollers, a pair of track members mounted on the inner sides of said frame walls and extending along the greater portion of the length thereof, a pair of rack members of substantially the same length as that of said track members mounted on the inner sides of the frame walls below said track members, a vehicle body having bottom and side walls mounted for longitudinal movement on said track members; means for propelling said vehicle along the ground, comprising a pair of rotary motors mounted within said body in transversely spaced relation with each other, each of said motors having a shaft projecting therefrom and having on its outer end a sprocket in engagement with one of said treads for propelling said tread in either direction independently of the other; and means for moving said body along said track members, comprising another pair of rotary motors mounted within said body in transversely spaced and synchronized relation, each of said motors having a shaft projecting therefrom and having on its outer end a gear wheel in engagement with one of said rack members for moving said body along said tracks in either direction.

5. An endless track vehicle as claimed in claim 4 in which a relatively short rear end section of the frame, together with the treads thereon, is inclined rearwardly from the bottoms of said treads, and in which the weight of the vehicle body when moved over said short inclined section of the frame will raise the front of the frame and treads and force the short inclined sections of the treads into contact with the ground.

6. A endless track vehicle as claimed in claim 4 and including electrically actuated control means for effecting cooperative operation of all of said motors.

7. An endless track vehicle as claimed in claim 6 and including an idler tread unit installed between the main treads of the short inclined rear section.

8. In an endless track vehicle having an elongated frame with transversely spaced side walls, a plurality of tread supporting rollers journaled on the outer sides of said walls, a pair of endless treads mounted on said rollers, a pair of track members mounted on the inner sides of said frame walls and extending along the greater portion of the length thereof, a pair of rack members of substantially the same length as that of said track members mounted on the inner sides of the frame walls below said track members, a pair of circular vehicle body supports mounted on said track members in non-rotatable but longitudinally movable relation therewith, a vehicle body having a bottom wall and side walls, said side walls having central openings surrounding the peripheries of said body supports and provided with means for mounting said body on said supports in rotatable relation therewith; means for propelling said vehicle along the ground, comprising a pair of rotary motors mounted within said body in transversely spaced relation with each other, each of said motors having a shaft projecting therefrom and having on its outer end a sprocket in engagement with one of said treads for propelling said tread in either direction independently of the other; means for moving said body along said track members, comprising another pair of rotary motors mounted within said body in transversely spaced and synchronized relation, each of said motors having a shaft projecting therefrom and having on its outer end a gear wheel in engagement with one of said rack members for moving said body along said track members in either direction; and means for rotating said body on said body supports, comprising a pair of large annular gears, and, at least, one rotary motor fixedly attached to the bottom wall of said body, and a pair of small gears driven by said motor in engagement with said large annular gears for rotating said body on said body supports; said motors for driving the treads and the motors for moving said body along said track members, and also said large annular gears, being provided with means separately from said body for rigidly mounting them on said body supports.

9. An endless track vehicle as claimed in claim 8 in which a relatively short rear end section of the frame, together with the treads thereon, is inclined rearwardly from the bottoms of said treads, and in which the weight of the vehicle body when moved over said short inclined section of the frame will raise the front of the frame and treads and force the short inclined sections of the trends into contact with the ground.

10. An endless track vehicle as claimed in claim 8 and including electrically actuated control means for effecting cooperative operation of, at least, all of said motors actuating the movement of said treads and vehicle body.

11. An endless track vehicle as claimed in claim 9 and including an idler tread unit installed between the main treads of the short inclined rear section.

12. In an endless track vehicle having an elongated frame with transversely spaced side walls, a plurality of tread supporting rollers journaled on the outer sides of said walls, a pair of endless treads mounted on said rollers, a pair of track members mounted on the inner sides of said frame walls and extending along the greater portion of the length thereof, a pair of rack members of substantially the same length as that of said track members mounted on the inner sides of the frame walls below said track members, a pair of circular vehicle body supports mounted on said track members in non-rotatable but longitudinally movable relation therewith, a vehicle body having a bottom wall and side walls, said side walls having central opening surrounding the peripheries of said body supports and provided with means for mounting said body on said supports in rotatable relation therewith; means for propelling said vehicle along the ground, comprising a pair of rotary motors rigidly mounted within a pair of transversely spaced housings which, in turn, are rigidly mounted on the inner sides of said body supports, each of said motors having a shaft projecting therefrom through bearings in said body supports and through slots in the vehicle frame, and having on its outer end a sprocket in engagement with one of said treads for propelling said tread in either direction independently of the other; means for moving said body along said track members, comprising another pair of rotary motors rigidly mounted within said housings in synchronized relation, each of said motors having a shaft projecting therefrom through bearings also in said body supports and through slots in the vehicle frame, and having on its outer end a gear wheel in engagement with one of said rack members for moving said body along said track members in either direction; and means for rotating said body on said body supports, comprising a pair of large annular gears rigidly mounted on the opposed walls of said housings, and, at least, one rotary motor fixedly attached to the bottom wall of said body, and a pair of small gears driven by said motor in engagement with said large annular gears for rotating said body on said body supports.

13. An endless track vehicle as claimed in claim 12 in which a relatively short rear end section of the frame, together with the treads thereon, is inclined rearwardly from the bottoms of said treads, and in which the weight of the vehicle body when moved over said short inclined section of the frame will raise the front of the frame and treads and force the short inclined sections of the treads into contact with the ground.

14. An endless track vehicle as claimed in claim 13 and including an idler tread unit installed between the main treads of the short inclined section.

15. An endless track vehicle as claimed in claim 12 and including electrically actuated control means for effecting cooperative operation of, at least, all of said motors actuating the movement of said treads and vehicle body.

References Cited by the Examiner

UNITED STATES PATENTS

| | | | |
|---|---|---|---|
| 1,364,233 | 1/21 | Beagle | 180—5 X |
| 1,887,932 | 11/32 | Ketonen | 180—6.7 |

BENJAMIN HERSH, *Primary Examiner.*

A. HARRY LEVY, *Examiner.*